US006588321B1

(12) United States Patent
Stoppek

(10) Patent No.: US 6,588,321 B1
(45) Date of Patent: Jul. 8, 2003

(54) CLOSED CAVITY PISTON AND METHOD OF MAKING THE SAME

(75) Inventor: Robert J. Stoppek, Ames, IA (US)

(73) Assignee: Sauer-Danfoss Inc., Ames, IA (US)

( * ) Notice: Subject to any disclaimer, the term of this patent is extended or adjusted under 35 U.S.C. 154(b) by 453 days.

(21) Appl. No.: 09/722,617

(22) Filed: Nov. 27, 2000

(51) Int. Cl.[7] .................................................. F16J 1/00
(52) U.S. Cl. ........................................... 92/260; 92/172
(58) Field of Search ........................... 92/231, 260, 71, 92/172; 29/888.04, 888.042

(56) References Cited

U.S. PATENT DOCUMENTS 5,076,148 A * 12/1991 Adler ........................... 92/172
5,642,654 A * 7/1997 Parekh et al. ................. 92/260

* cited by examiner

Primary Examiner—Edward K. Look
Assistant Examiner—Thomas E. Lazo

(57) ABSTRACT

A closed cavity piston includes an elongated piston body and a separately formed piston cap having an elongated stem and head thereon. The body includes a closed end and an open end with a cavity having a bottom wall adjacent the closed end and an outer wall terminating in a rim at the open end. The stem of the piston cap is friction inertia welded to the bottom wall of the piston body and the head of the piston cap welds to the rim of the piston body so as cover the open end and sealingly enclose the cavity. The piston components can both be formed by conventional and relatively inexpensive cold forming techniques. The stem of the cap is inserted into the cavity of the body until it engages the bottom wall. Then the cap is friction inertia welded to the body at the stem/bottom wall and head/rim interfaces.

15 Claims, 5 Drawing Sheets

CLOSED CAVITY PISTON AND METHOD OF MAKING THE SAME

BACKGROUND OF THE INVENTION

The present invention relates to the field of hydrostatic units such as transmissions, pumps and motors. More particularly, this invention relates to closed cavity or reduced oil volume pistons that slidably reciprocate in the cylinder bores of hydrostatic units.

Conventional closed cavity pistons have been utilized in hydrostatic units for a variety of agricultural, turf care and construction equipment. One type of conventional closed cavity or reduced oil volume piston has an elongated cylindrical main body and a truncated cylindrical cap. One end of the main body is closed and the other end has a deep target-shaped or annular cavity formed therein by a relatively expensive "target drilling" operation. The target drilling operation leaves a centrally located stem that is integral with the closed end of the main body and protrudes to the open end. The cap is cold formed and has opposite closed and open. ends. The open end includes an annular groove and truncated stem portion such that the cap registers and mates with the stem and outer wall of the main body at its open end. This conventional piston is assembled by adding a washer between the stem and inner wall of the main body near the open end. The washer is included to help center and stabilize the stem during welding. Then the cap and main body are inertia-friction welded together along a single transverse plane where their respective open ends meet. The result is a lightweight hollow closed cavity piston, but the cost and complexity of the target drilling operation make it a relatively expensive piston. Considering that hydrostatic units typically require several pistons for each unit, piston cost profoundly affects the overall cost of the units and hydrostatic transmissions they go into. Therefore, there is a need for a closed cavity piston and method of making the same e that eliminates the target drilling operation and reduces cost.

SUMMARY OF THE INVENTION

T he present invention relates to a closed cavity piston for hydrostatic units and methods of making the same. The closed cavity piston of this invention includes an elongated piston body and a separately formed piston cap having an elongated stem and head thereon. The body includes a closed end and an open end with a cavity having a bottom wall adjacent the closed end and an outer wall terminating in a rim at the open end. The stem of the piston cap is friction inertia welded to the bottom wall of the piston body and the head of the piston cap welds to the rim of the piston body so as cover the entrance opening and sealingly enclose the interior cavity. The piston components can both be formed by conventional and relatively inexpensive cold forming techniques. The stem of the cap is inserted into the cavity of the body until it engages the bottom wall. Then the cap is friction inertia welded to the body at the stem/bottom wall and head/rim interfaces.

DETAILED DESCRIPTION OF THE PREFERRED EMBODIMENT(S)

Figure 1:
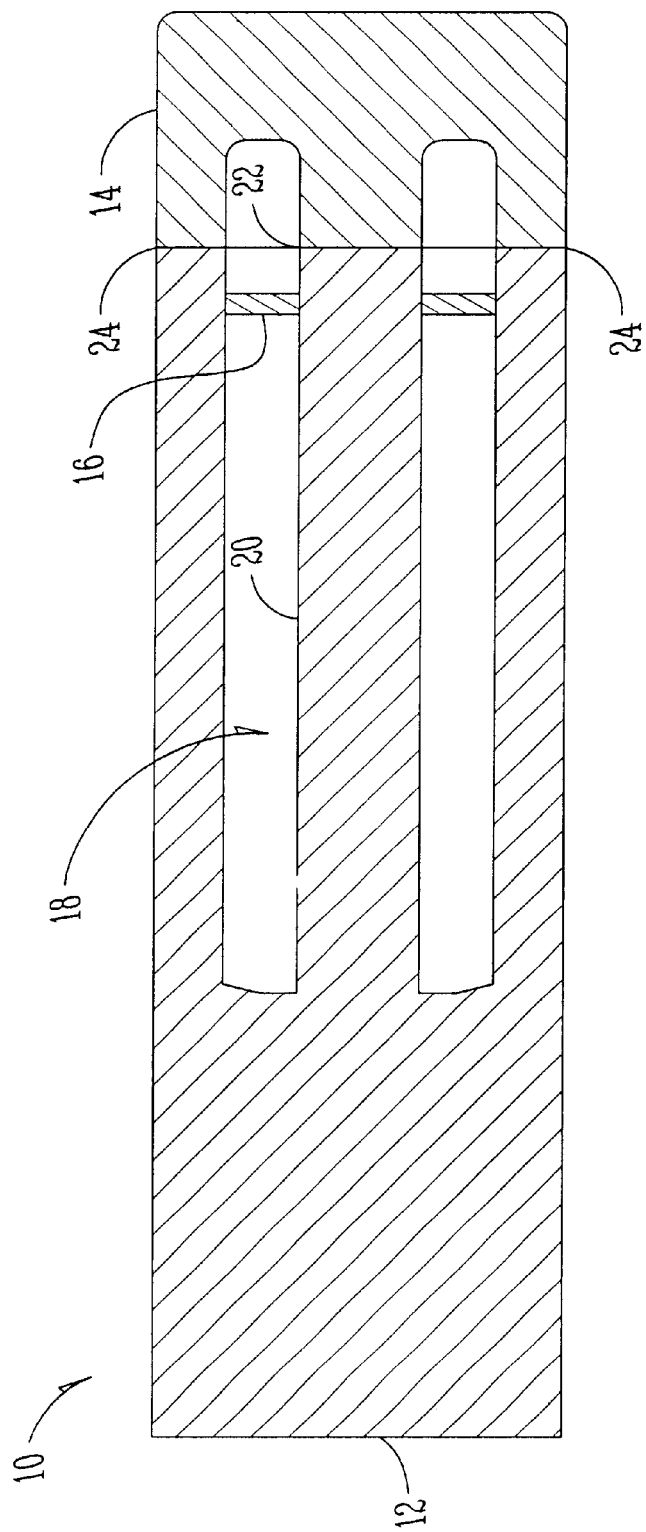
FIG. 1 is a central longitudinal cross-sectional view of a conventional piston.
Figure 2:
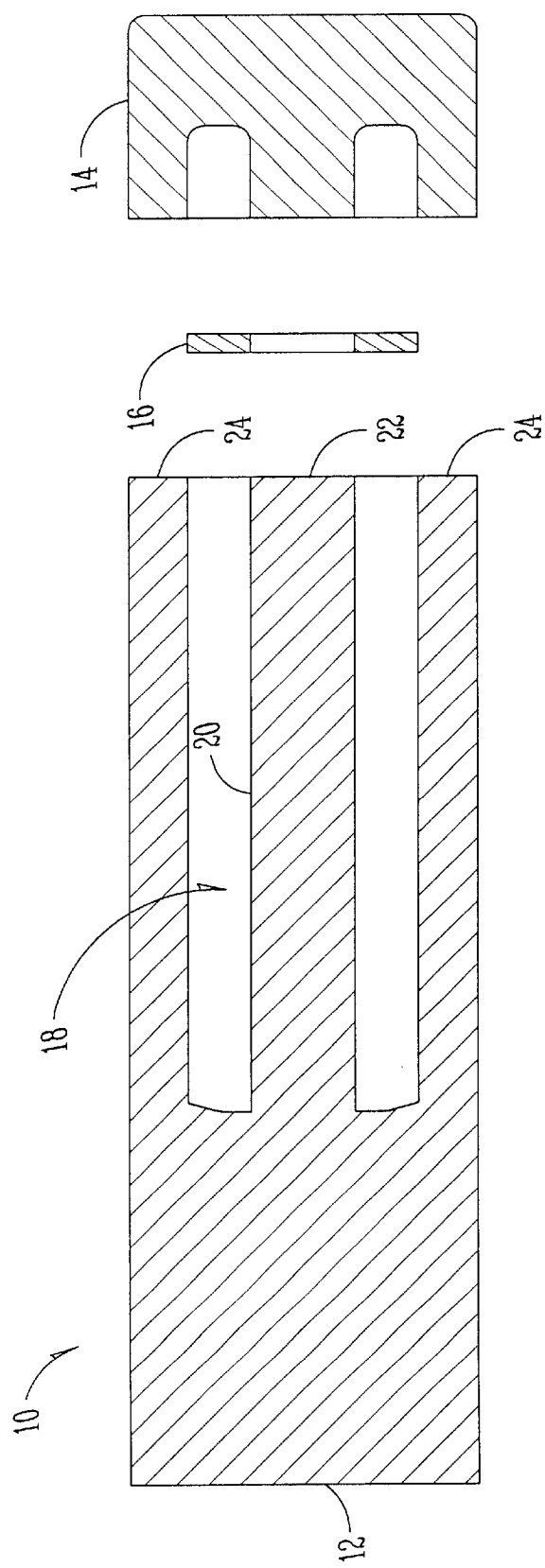
FIG. 2 is an exploded assembly view in longitudinal cross-section of the piston of FIG. 1.

A conventionally formed inertia welded piston 10 is shown in FIGS. 1 and 2. As briefly described above, the piston 10 includes a steel piston body 12, a cold formed steel piston cap 14 and a metal washer 16. The piston body 12 has a closed end, an open end, and an annular interior cavity 18. A stem 20 protrudes from the closed end of the piston body. The free end 22 of the stem 20 lies in the same plane as the rim 24 of the piston body 12. The piston cap 14 is cylindrical like the piston body 12 and is cold formed. However, because of the elongated stem 20, the piston body 12 cannot be cold formed. Instead, an expensive target drilling operation is required to form the cavity 18 and the stem 20. The cap 14 is inertia welded to the piston body 12 in a single transverse plane that includes the rim 24 and the end 22 of the stem 20.

Figure 3:
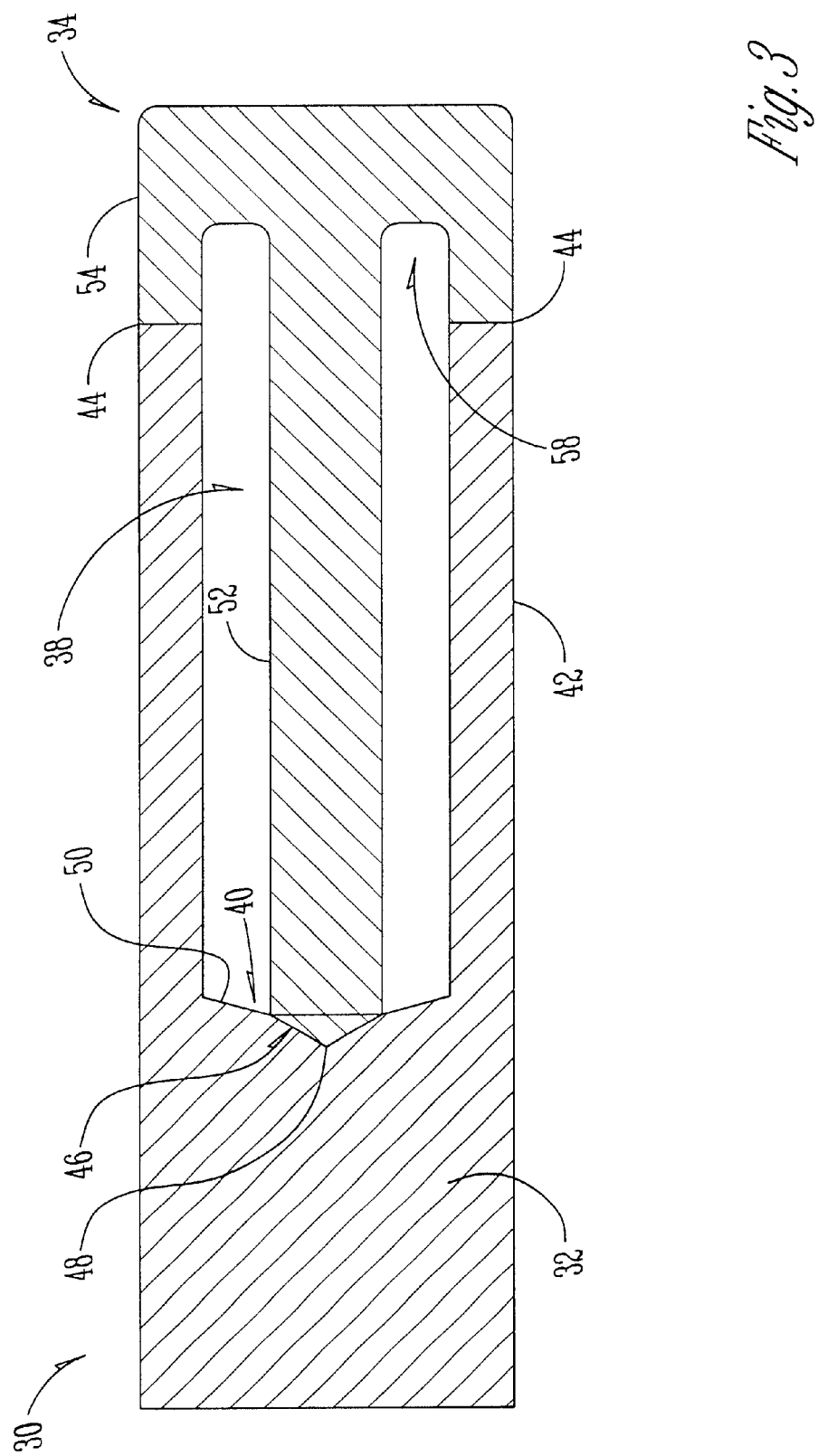
FIG. 3 is a central longitudinal cross-sectional view of a piston produced according to this invention.
Figure 4:
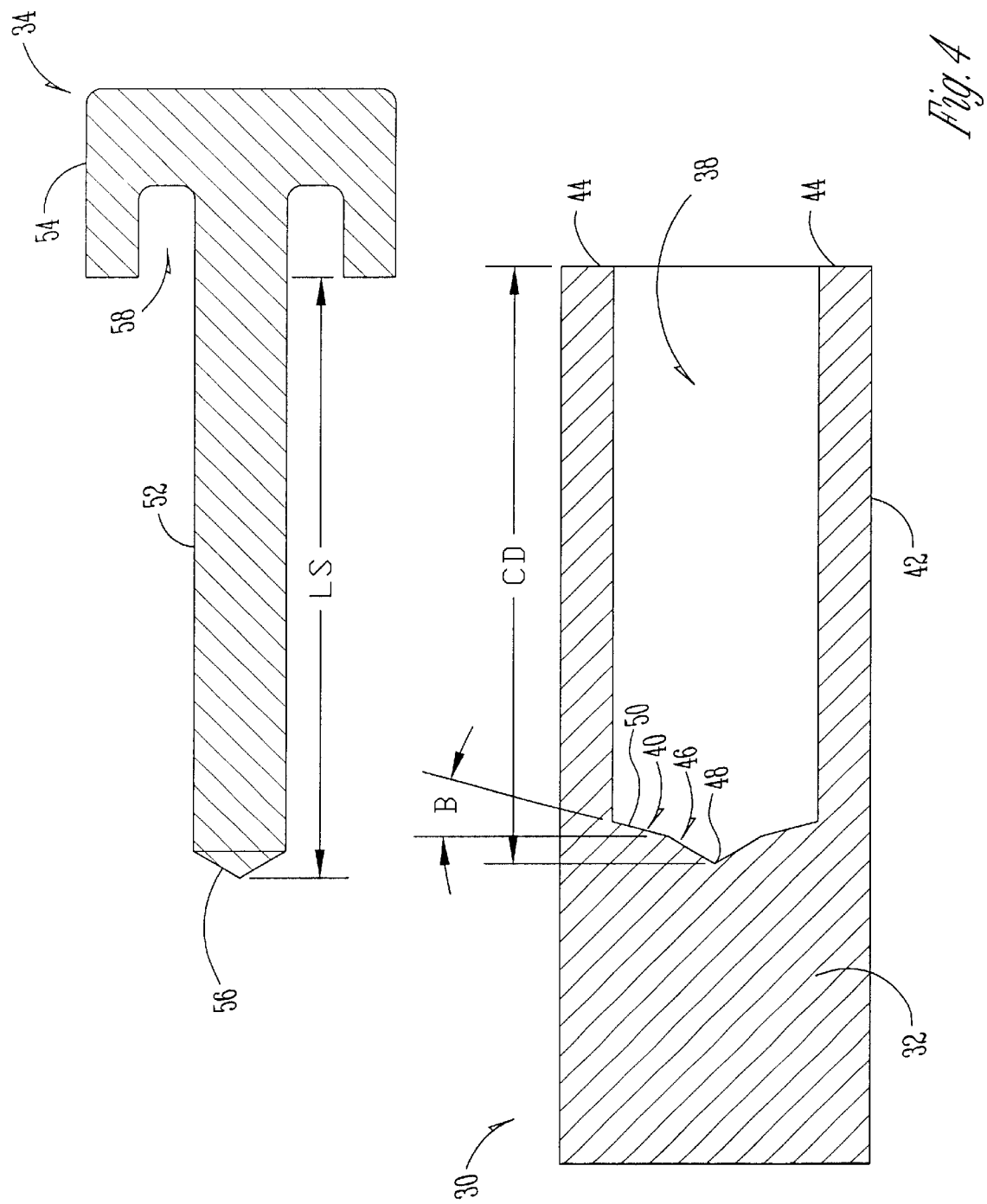
FIG. 4 is an exploded assembly view in longitudinal cross-section of the piston of FIG. 3.

Referring to FIGS. 3 and 4, the piston 30 of the present invention includes a steel piston body 32 and a steel piston cap 34. The piston body 32 is elongated and has opposite open and closed ends. The piston body 32 is cylindrical and has a centrally located, generally cylindrical interior cavity 38. The open end of the piston body has an entrance opening therein and the interior cavity 38 extends inwardly from the entrance opening so as to define a bottom wall 40 adjacent the closed end and outer wall 42 terminating in a rim 44 which is facing longitudinally at the open end of the piston body 32 adjacent the entrance opening.

The bottom wall 40 has a socket 46 formed therein, which includes a recessed central portion 48 and a countersink 50 leading thereinto. In the embodiment shown in FIGS. 3 and 4, the recessed central portion 48 is conical and is defined by an included angle of between 90 degrees and 165 degrees, more preferably about 120 degrees to allow formation with standard drills having 118 degree drill points if the parts are not cold formed with the bottom wall configuration complete. Preferably the countersink 50 forms an angle B of approximately 15 degrees with respect to a plane that is perpendicular to the central longitudinal axis of the piston body 32.

The cap 34 includes an elongated cylindrical stem 52 with a central longitudinal axis, opposite first and second ends, and a head 54 at the first end. The head 54 protrudes outwardly from the stem 52 in a direction transverse to the longitudinal axis of the stem. The head 54 is of sufficient size to cover the entrance opening of the piston body 32. The head 54 of the cap 34 can include an optional annular recess or groove 58 surrounding the stem 52 to remove further weight from the piston 30.

In the embodiment shown in FIGS. 3 and 4, the second end 56 of the stem 52 is conical in shape so as to approximately mate with and engage the similarly shaped recessed central portion 48 of a socket 46 in the bottom wall of the piston body 32. The countersink 50 of the socket 46 helps guide the second stem end 56 into the recess 48. The conical second end 56 of the stem has an included angle of between approximately 90 degrees and 165 degrees, more preferably about 120 degrees.

Figure 5:
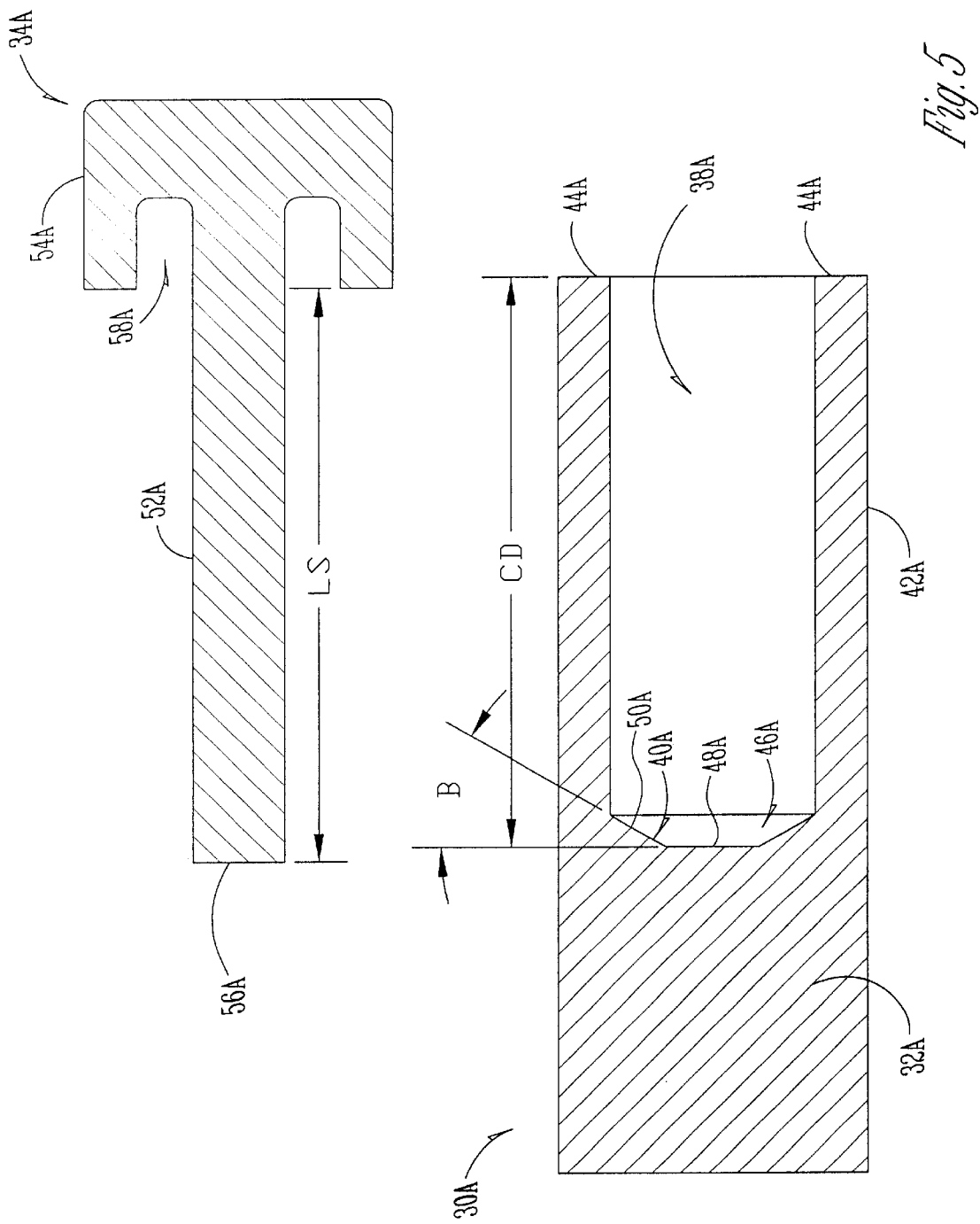
FIG. 5 is an exploded assembly view similar to FIG. 4 but shows an alternative stem end and bottom wall configuration.

The embodiment shown in FIG. 5 is similar to the embodiment of FIGS. 3 and 4 in that the piston cap 34A attaches to the piston body 32A, which has a central bore or interior cavity 38A therein, an outer wall 42A with a rim 44A, and a bottom wall 40A. However, the second end 56A of the stem 52A has a planar surface that extends perpendicular to the longitudinal axis of the stem. Likewise, the recessed central portion 48A of the socket 46A includes a round area defined by a planar surface extending perpendicular to the longitudinal axis of the piston body 32A. The round area of the recess 48A has a diameter that is approximately the same as the diameter of the second end 56A of the stem 52A. A countersink 50A is provided to guide the stem into the recess 48A.

To produce the piston 30 or 30A of this invention, the process is basically the same. The piston body 32, 32A and piston cap 34, 34A are both preferably provided in a ready-to-weld condition with the stem and bottom wall features already completed through a cold forming process. Alternatively, the components can be machined from scratch. At any rate, the relatively expensive target drilling operation is not required.

The stem 52, 52A inserts into the interior cavity 38, 38A until it engages the bottom wall 40, 40A. Then the components 32 and 34 or 32A and 34A are rotated relative to each other to join them by friction inertia welding. The length of the stem 52, 52A is slightly greater than the depth of the cavity 38, 38A to allow for the usual loss of length associated with inertia welding. Thus, the length of the stem LS is greater than the depth of the cavity CD by an amount sufficient to account for material loss at both the stem/bottom wall interface and the head/rim interface. However, care should be taken that LS is not too much greater than CD. Otherwise, the weld at the rim will be adversely affected or the stem will buckle. A buckled stem can cause problems when one later attempts to drill the conventional small longitudinal orifice hole through the piston via the stem. Friction-inertia welds are formed at the two different interfaces, which reside in at least two different planes. This is in contrast to conventional inertia welded pistons, which are welded in a single plane.

It will be understood from the drawings and the above description that the respective geometric attributes of the cap, stem end, piston body are parameters that can be adjusted to optimize the integrity of the friction inertia welds.

Based upon the foregoing it can be seen that the present invention at least satisfies its stated objectives.

In the drawings and specification, there has been set forth a preferred embodiment of the invention, and although specific terms are employed, these are used in a generic and descriptive sense only and not for the purpose of limitation. Changes in the form and the proportion of parts as well as in the substitution of equivalents are contemplated as circumstances may suggest or render expedient without departing from the spirit or scope of the invention as further defined in the following claims.

What is claimed is:

1. A closed cavity piston comprising:
    an elongated piston body including a closed end and an open end, the open end having an entrance opening therein and a cavity extending inwardly from the entrance opening so as to define a bottom wall adjacent the closed end and an outer wall terminating in a longitudinally facing rim at the open end adjacent the entrance opening;
    a piston cap formed separately from the piston body and including an elongated stem having a central longitudinal axis, opposite first and second ends, and a head at the first end, the head protruding outwardly from the stem in a direction transverse to the longitudinal axis of the stem;
    the stem of the piston cap being attached to the bottom wall of the piston body; and
    the head of the piston cap of being sufficient size and being attached to the longitudinally facing rim of the piston body so as to cover the entrance opening and sealingly enclose the interior cavity.

2. The piston of claim 1 wherein the second end of the stem engages a recessed socket formed in the bottom wall of the piston body.

3. The piston of claim 2 wherein the socket includes a recessed central portion and a countersink portion leading thereinto.

4. The piston of claim 3 wherein the recessed central portion is conical.

5. The piston of claim 3 wherein the recessed central portion is a planar surface that extends perpendicular to a longitudinal axis of the piston body and includes a round area for engaging the second stem end.

6. The piston of claim 5 wherein the second end of the stem terminates in a substantially planar end surface extending perpendicular to the longitudinal axis of the stem.

7. The piston of claim 6 wherein the planar end surface of the second end of the stem is round and has a diameter approximately the same as the round area on the recessed central portion of the bottom wall of the piston body.

8. The piston of claim 4 wherein the stem end is conical and has an included angle of between approximately 90 to 165 degrees.

9. The piston of claim 8 wherein the conical stem end has an included angle of approximately 120 degrees.

10. The piston of claim 1 wherein the piston body is formed by a cold forming process into a ready-to-weld condition, thereby allowing attachment of the piston cap to the piston body takes place without requiring intervening machining operations on the piston body.

11. A method of producing a closed cavity piston comprising the steps of:
    providing an elongated piston body including a closed end and an open end, the open end having an entrance opening therein and a cavity extending inwardly from the entrance opening so as to define a bottom wall adjacent the closed end and an outer wall terminating in a rim at the open end adjacent the entrance opening;

providing a pistols cap including an elongated stem having a central longitudinal axis, opposite ends, and a head at one of the ends, the head protruding outwardly from the stem in a direction transverse to the longitudinal axis of the stem;

inserting the stem of the piston cap into the interior cavity of the piston body until the stem engages the bottom wall;

inertia-friction welding the stem of the piston cap to the bottom wall of the piston body;

welding the rim of the piston cap to the rim of the piston body;

whereby the piston body and piston cap are sealingly joined together to enclose the interior cavity.

12. The method of claim 11 wherein the welding of the rim of the piston body to the rim of the piston cap is done by inertia-friction welding.

13. The method of claim 12 wherein both the inertia-friction welding of the stem to the piston body and the rim of the piston cap to the rim of the piston body take place simultaneously as the piston body and piston cap are rotated relative to each other.

14. The method of claim 11 wherein the piston body is provided by a cold forming process.

15. The method of claim 14 wherein the piston cap is provided by a cold forming process.

* * * * *